United States Patent
Styers et al.

(10) Patent No.: US 7,468,676 B2
(45) Date of Patent: Dec. 23, 2008

(54) REMOTE GARAGE DOOR MONITORING SYSTEM

(76) Inventors: Justin R. Styers, 8301 W. 125th St., Overland Park, KS (US) 66213; Ryan H. McDowell, 3015 W. 89th St., Leawood, KS (US) 66206

( * ) Notice: Subject to any disclaimer, the term of this patent is extended or adjusted under 35 U.S.C. 154(b) by 0 days.

(21) Appl. No.: 11/944,121

(22) Filed: Nov. 21, 2007

(65) Prior Publication Data

US 2008/0062000 A1 Mar. 13, 2008

Related U.S. Application Data

(62) Division of application No. 11/051,737, filed on Feb. 4, 2005.

(51) Int. Cl.
*G08B 17/00* (2006.01)
*G08B 21/00* (2006.01)
*G08B 1/00* (2006.01)
*G05B 23/02* (2006.01)
*G05B 19/00* (2006.01)

(52) U.S. Cl. .............................. 340/686.1; 340/309.16; 340/540; 340/3.1; 340/5.7; 340/5.71

(58) Field of Classification Search .................. None
See application file for complete search history.

(56) References Cited

U.S. PATENT DOCUMENTS

| | | | |
|---|---|---|---|
| 4,035,703 A | 7/1977 | Hablützel | 318/345 |
| 4,218,681 A | 8/1980 | Hörmann | 455/603 |
| 4,464,651 A | 8/1984 | Duhame | |
| 4,496,942 A | 1/1985 | Matsuoka | 340/696 |
| 4,583,081 A | 4/1986 | Schmitz | 340/545 |
| 5,315,953 A | 5/1994 | Mullarkey, Jr. | 116/28 R |
| 5,510,686 A | 4/1996 | Collier | 318/446 |
| 5,689,236 A | 11/1997 | Kister | 340/545 |
| 5,737,400 A | 4/1998 | Bagchi et al. | 379/142.01 |
| 5,798,681 A | 8/1998 | Chang | 340/815.45 |
| 5,883,579 A | 3/1999 | Schreiner et al. | 340/686 |
| 6,049,285 A | 4/2000 | Mangal et al. | 340/686.1 |
| 6,166,634 A | 12/2000 | Dean | 340/545.1 |
| 6,308,083 B2 | 10/2001 | King | 455/556 |
| 6,437,527 B1 * | 8/2002 | Rhodes et al. | 318/280 |
| 6,553,238 B1 | 4/2003 | Ginzel et al. | 455/557 |
| 6,703,930 B2 | 3/2004 | Skinner | 340/539.11 |
| 6,766,372 B1 | 7/2004 | Stern | 709/227 |
| 6,967,565 B2 * | 11/2005 | Lingemann | 340/310.11 |

(Continued)

*Primary Examiner*—Julie Lieu
(74) *Attorney, Agent, or Firm*—Woodard, Emhardt, Moriarty, McNett & Henry LLP

(57) ABSTRACT

An apparatus and methods for implementing a garage door monitoring system coupled to a garage door opener. The door monitoring system allows a user to actuate the door under control via a network connection. In at least one embodiment, the door monitoring system is controlled by a cell phone or networked appliance capable of transmitting information and data via a cellular telephone network. The door monitoring system provides the added advantage of allowing a remote user to view the areas or regions near to the door under control prior to actuating the door. At least one embodiment comprises a method to validate reception of the pictures or video clips of the areas or regions near to the door prior to enabling the system to actuate the door. In another embodiment a pass code is embedded into the pictures or video provided to the remote user.

6 Claims, 9 Drawing Sheets

U.S. PATENT DOCUMENTS

| | | |
|---|---|---|
| 7,024,819 B1 | 4/2006 | Irvin et al. |
| 7,170,998 B2 | 1/2007 | McLintock et al. |
| 7,289,014 B2 * | 10/2007 | Mullet et al. .................. 340/5.7 |
| 2002/0183008 A1 | 12/2002 | Menard et al. ................. 455/66 |
| 2003/0081747 A1 | 5/2003 | Ahistrom et al. ........ 379/102.06 |
| 2003/0118237 A1 | 6/2003 | Laird ......................... 382/209 |
| 2004/0060808 A1 | 4/2004 | LaViolette ................... 202/234 |
| 2004/0267385 A1 * | 12/2004 | Lingemann .................. 700/83 |
| 2006/0009863 A1 * | 1/2006 | Lingemann .................. 700/19 |

* cited by examiner

REMOTE GARAGE DOOR MONITORING SYSTEM

CROSS-REFERENCE TO RELATED APPLICATIONS

This application is a divisional of U.S. patent application Ser. No. 11/051,737, filed Feb. 4, 2005 entitled REMOTE GARAGE DOOR MONITORING SYSTEM, which is hereby incorporated by reference.

This application is also related to International Patent Application No. PCT/US2006/01671, filed Jan. 17, 2006, which is also incorporated herein by reference.

BACKGROUND OF THE INVENTION

Many individuals have installed garage door openers to implement a safe and convenient means of controlling the opening and closing of an overhead door without exiting their car.

In addition, garage door servicing companies provide services to monitor garage doors. In the event of a malfunction or failure, the dispatch of the service technicians can be managed with more flexibility on the basis of an evaluation of the data transmitted.

U.S. Pat. No. 6,553,238 shows a device and method for the remote diagnosis and/or remote monitoring and/or remote utilization of a microprocessor controlled door, door system, or garage door system operated by an electric motor. The microprocessor control can be connected with a data transmission device for performance of a remote diagnosis and/or remote monitoring and/or remote utilization of the microprocessor control. This patent also discloses a data transmission device or modem adapter that can connect the microprocessor control to a cellular telephone, whereupon a communication connection with a service center is established and the remote diagnosis and/or remote monitoring and/or remote utilization of the microprocessor control unit is performed from the service center.

U.S. Patent Publication 2002/0183008 shows a monitor with a sensor to indicate the position of a door coupled to a door opener. The module is compatible with a wireless communication protocol that operates over both a long range and short range. In addition, a door position sensor coupled to the module provides information to the user over a wireless communication channel. In one embodiment, information from the additional door position sensor is wirelessly transmitted. In another embodiment, an audio transducer couples to the module, corresponding to voice commands to operate the door opener. This publication also describes a system and methods which allows remote control and management of single or multiple door openers using a wired or wireless communication device. The device may be a cellular telephone, a pager, a personal digital assistant, a computer, or other device that communicates using a network.

U.S. Patent Publication No. 2003/0118237 shows a system for detecting objects, including a digital image device such as a CCD camera to control a defined area for unauthorized intrusion. The digital imaging device uses a predetermined pattern positioned across a defined area from the device. The processor periodically compares the image stored in the memory with a digital representation of the predetermined pattern and a signal is sent to a control unit when the correlation is missing as a result of the object entry field of vision of the digital imaging device and obscuring said predetermined pattern.

SUMMARY OF THE INVENTION

One object of the present invention is to provide an improved garage door monitoring system. The door monitoring system herein disclosed advantageously provides a user the ability to safely actuate garage doors, doors, windows, sun windows, hatches, gates, and other opening from a remote location while viewing both the interior and exterior side of the door, doorway, entry, entryway, gate, gateway, or portal. Related objects and advantages of the present invention will be apparent from the following description.

A first embodiment of the garage door monitoring system advantageously allows a user to receive a voice notification message prompting the user to remotely control a garage door opener to actuate a garage door from a remote location. Another embodiment of the system includes a door status sensor having a door open state and a door closed state, a control unit operably coupled to the door status sensor, wherein the control unit comprises a timer, a timer alarm period parameter, a control output controlling the garage door opener; an interface operably coupled to a network, and a voice message generator providing at least one voice message to the user via the network connection when the door status sensor is in the door open state for a time period greater than the timer alarm period parameter. In some embodiments, the user interface of the door monitoring system allows the user to specific different timer alarm periods depending upon the time of day, day of the week, level of sunlight, and/or vacation or business travel.

Still another embodiment of the garage door monitoring system allow the remotely located user to view regions and areas near to the door under control to minimize the potential for loss or injury. The door monitoring system includes interior and exterior cameras operably coupled to a control unit and positioned to view an area near to the interior and exterior sides of the garage door. The system provides the remote user with at least one picture of the areas near to the interior and exterior side of the doorway. The user interface allows the user to remotely actuate the garage door using a networked appliance capable of displaying a picture; wherein, a means of providing a safety interlock confirms the remote device has received at least one picture of the area near to the interior and exterior sides of the door under control prior to enabling the user to actuate the garage door. Other embodiments provide continuously updated pictures.

Another aspect of the door monitoring system includes embodiments having a system override mechanism, which allows a user to temporarily place the door monitoring system 20 in a system disable state, which disables the notification feature while maintaining access to other control and monitoring features of the door monitoring system. One aspect of the override mechanism is that a user may call or connect via a communications network to the door monitoring system and remotely actuate the door under control or obtain various status reports while the system override mechanism is asserted. In addition, other embodiments allow a user to remotely re-enable the door monitoring system by turning off the system override mechanism. Another embodiment of the override system includes a feature that re-enables the door monitoring system's notification function after a maximum period of time passes. Another aspect of the re-enabling function is some embodiments comprise a user interface that informs the user that the system is in the override state. Still other embodiments re-enable the notification feature upon detecting a door closure. In additional, other embodiments include methods for enabling the notification feature at a specific time of day or level of sunlight.

Still another aspect of the door monitoring system is that some embodiments provide a voice based notification message to a user related to the door status.

Another embodiment of the system includes a method for providing a user with a voice notification message that a door is open comprising steps of detecting the state of the door status sensor, calculating an open door time period and sending at least one voice notification message via the network connection to the message destination.

Some embodiments include the further feature of generating a voice message requesting the user provide a password to gain access to the functions of the door monitoring system. Still other embodiments include generating at least one voice message to permit a user to control the actuation of a garage door. In some embodiments, the door monitoring system provides a single picture of the interior and exterior areas. In other embodiments the door monitoring system continuously updates the picture or video stream.

Some embodiments of the notification function include as a feature providing for multiple notification destinations. In at least one embodiment, the door monitoring system provides a method comprising the steps of providing a user interface to the user to implement a message delivery prioritization scheme which allows the user to specify and rank message destinations by specifying at least one prioritization parameter; wherein, the user identifies the order of the messages destinations to which the door monitoring system sends messages. The system then selects the message destinations based upon the prioritization scheme. Thereafter, the door monitoring system selectively sends messages indicating that the door status sensor is in the door open state to at least one destination based.

Still other embodiments further include a method of sending a message reporting that the door status sensor has been in the door open state for a period of time at least equal to the timer alarm period. The method includes sending a report to a first message destination and to at least one alternative message destination. As a feature, some embodiments change the desired or priority of the message destination based upon time of day. Other embodiments change the message destination based upon day of the week. Still other embodiments adjust the selection of the message destination based upon a user's travel plans.

The door monitoring system also advantageously provides a number of reporting functions that are accessible either by a local or remote user. In a least one embodiment, the door monitoring system provides an activity log to a networked appliance to a remotely located user. The activity log report may comprise text, graphics, or voice messages.

Yet another advantage of the door monitoring system described herein is the feature of verifying receipt of pictures by networked appliance used by the user. Some embodiments include a method comprising the steps of receiving a command to actuate a garage door; providing a picture of an area on the interior side of the garage door and a picture of an area on the exterior side of the garage door via the network connection to a device connected to the network, wherein the pictures allow the user to deduce the desirability of actuating the garage door; and receiving a message verifying that the device connected to the network received the pictures of the interior side and exterior side of the garage door. In addition, other embodiments include a further feature of enabling the control unit function to remotely actuate the garage door after receiving verification that the pictures of the areas on the interior and exterior side of the garage door were successfully received.

Still other embodiments require a user to provide a pass code or word that was embedded within the pictures or video provided to the user before enabling the control unit to execute a remote command to actuate the door. Still other embodiments of the door monitoring system include as a feature generating a voice message to prompt confirmation of the request to actuate the garage door after the control unit function to remotely actuate the garage door is enable, receiving an indication confirming the command to actuate a garage door; actuating the garage door. And still another aspect of the door monitoring system advantageously provides a method of tracking the passage of time after enabling the control unit function to remotely actuate the garage door and disabling the control unit function to remotely actuate the garage door after the passage of a time out period of time.

Another embodiment of the door monitoring system includes a call director used to share a telephone line between the door monitoring system and other appliances using the phone line. Still other embodiments include a caller ID feature wherein the door monitoring system screens out calls or network accesses from unauthorized users based upon the calling telephone number. In addition, other embodiments screen for unauthorized use by comparing the network ID or other identifying means to those authorized by the user.

Yet another aspect of the door monitoring system is that some embodiments have the ability to store the video images, sequences, and or pictures associated with the remote commands received by the door monitoring system. Illustratively, at least one embodiment includes a method of storing an image from the interior and exterior cameras associated with the actuation of the door under control to a recording device. In some embodiments the video or picture sequences are initially placed in a circular buffer memory; and only a portion of the pictures in the circular buffer are stored for later recall.

To verify that pictures provided by the door monitoring system were received by the user's networked appliance, some embodiments of the door monitoring system include using a viewable pass code that is integrated into the provided video or picture; wherein, the user provides the pass code to the door monitoring system to confirm a command to actuate a door. Other embodiments include a message from a cell phone or similar networked appliance or application providing an indication that the user received the video or picture sent by the door monitoring system. Yet, other embodiments provide a voice message pass code; wherein, the door monitoring system generates a voice prompt containing a pass code which the user enters to confirm a command to actuate a door. In at least one embodiment, the door monitoring system includes a voice recognition system for decoding the responses of a user to the user interface prompts of the door monitoring system. As an additional safety feature, some embodiments provide a user with a prompt requesting conformation of the command to actuate the door; wherein, the user provides an indication confirming the initial command after the pictures are downloaded. In addition, still other embodiments include a timeout feature, which times out the command function when a confirmation of the initial command is not timely. This prevents a user from actuating a door based upon old data.

While embodiments are hereafter illustrated having the above described features and functions, only one, of such features and functions, or less than all, may be used in a particular door monitoring system.

DESCRIPTION OF THE PREFERRED EMBODIMENTS

Figure 1:
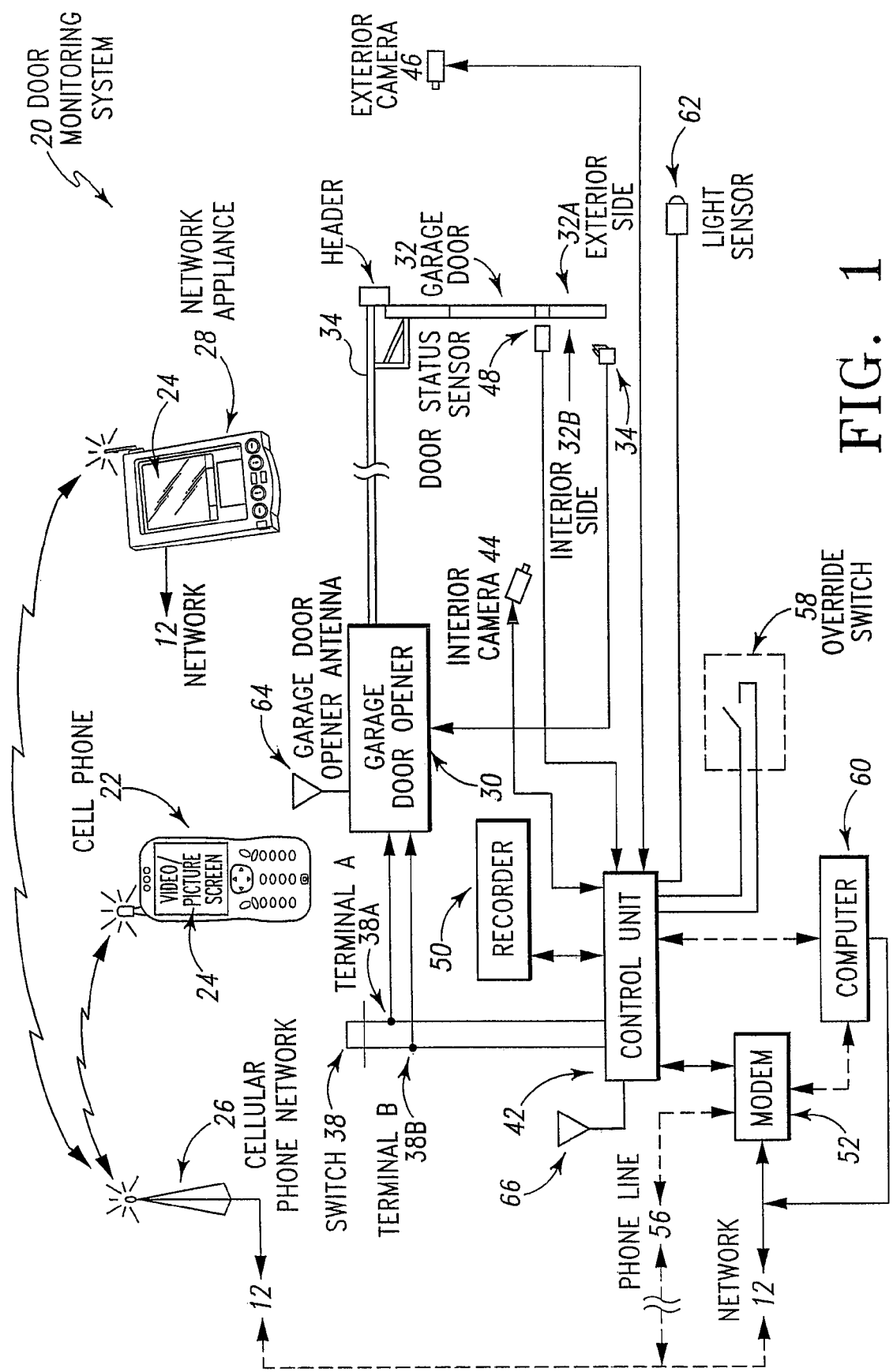
FIG. 1 is a schematic diagram of one embodiment of a door monitoring system.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

As shown in FIG. 1, a first embodiment of a door monitoring system 20 advantageously permits a remote user to actuate a garage door while viewing video of the areas near to the garage door. In addition to commercial and residential door monitoring applications, it will be appreciated that similar embodiments of the door monitoring system to be described also encompass remote control by users of doors other than garage doors. Illustrative, the described system also comprises control of gates, windows, shutters, blinds, draperies, sky lights, pool covers, portals and other similar applications. As such, it will be understood that many of the descriptions herein are meant for illustrative purposes of a general safety and security monitoring system and not limited to only a garage door monitoring system.

In addition, as explained later, door monitoring system 20 also provides the user with various features including, but not limited to, automatic notification that the door has been left open and the ability to open or close the door remotely while viewing the areas near to the interior and exterior side of the door. Other features of door monitoring system 20 include the ability to remotely request various reports on the status or activity of the entryway. Illustratively, some embodiments of the door monitoring system 20 allow a user to request an activity log that reports the remote access requests as well as door activities during a specified period of time. Other requests allow the user to call into the door monitoring system for a peace-of-mind check of the status of the door, obtaining the current status of the door, such as whether the door is open or closed. In addition, the remote command operations to be described can allow a user to remotely actuate a door under control to allow access by family member and/or service providers. Still other embodiments of the reporting mechanisms allow the user to view a video or picture of the areas near to the interior or exterior of the door being controlled. As discussed later, door monitoring system 20 also allows a user to remotely command a door to open or close while storing a video clip of the areas near to the door just prior, during, and after the command is executed.

Incorporated into the notification feature of door monitoring system 20 is a means for providing a remote user notification that the door is ajar via various network interfaces including, but not limited to, a telephone network, cellular telephone network, internet, or by any other networking means that would occur to one skilled in the art. An addition feature of door monitoring system 20 provides for simultaneous use of different aspects of network 12 depending upon the volume and type of data to be delivered or the location of the remote user. For example, door monitoring system 20 generates an initial call to the user via cellular telephone network 26. After successfully contacting the user, door monitoring system 20 delivers video or pictures to the remote user, such as via a high speed cable internet connection, while continuing to accept inputs over cellular phone network 26.

This notification system also permits a user to specify in advance various preferences. Illustratively, a user of the door monitoring system 20 selects multiple means of notification; wherein, door monitoring system 20 prioritizes the message destination based upon a selected set of criteria. Other embodiments of the door monitoring system 20 select the destination of the notification message based upon the time of day and/or the ambient light level detected in the areas near to the door under control. Still other embodiments of door monitoring system 20 selectively set the system alarm time, which corresponds to a user programmable timer alarm period parameter. The alarm time is the period of time between the opening of the door and the sending of the notification message.

In some embodiments, the alarm time varies depending upon the time of day, day of the week, or the ambient light level sensed in a region or area of interest. As a non-limiting example, some embodiments of door monitoring system 20 select a timer alarm period based upon the day of the week and time of day; while other embodiment select an timer alarm period based upon the ambient light detected in a region or an area of interest. Similarly, some embodiments of door monitoring system 20 provide for an immediate alert, without delay. For example, a user may enable the immediate alert feature between the hours of 10:00 am and 5:00 pm during the work week and during periods of out of town travel. This effectively sets the alarm period parameter to zero during the specified time periods.

As shown in FIG. 1, the door monitoring system 20 interfaces with other network appliances to allow a user to remotely actuate a garage door. Illustratively, in some embodiments, the door monitoring system 20 is operably coupled to network 12. Door monitoring system 20 uses network 12 to interface with a cell phone 22 having a video/picture screen 24. Cell phone 22 interfaces with a cellular phone network 26 that operably couples to a network 12. This provides a means of communication between the cell phone 22 and door monitoring system 20. Similarly, other network appliances 28, for example BlackBerry™ devices, Palm Pilot™ devices, computers, laptops, internet-based applications, browsers or java applets, interface with door monitoring system 20 to allow remote control and monitoring of a door.

Door monitoring system 20 comprises a garage door opener 30 operably coupled by a mechanism 34 for opening and closing a garage door 32, wherein the garage door has an exterior side 32a and an interior side 32b. The garage door opener further comprises an obstruction sensor 34 operably coupled to the garage door opener 30, which prevents garage door opener 30 from closing garage door 32 when the entrance is obstructed. In addition, garage door opener 30 interfaces with switch 38 having a terminal 38a and terminal 38b. Toggling switch 38 causes the garage door opener to actuate garage door 32.

Door monitoring system 20 further comprises control unit 42 and door status sensor 48. As shown in FIG. 1, control unit 42 includes an interface operably coupled to switch 38 that allows control unit 42 to control the garage door opener 30 to actuate garage door 32. Control unit 42 is also operably coupled to an interior camera 44 and an exterior camera 46. Interior camera 44 provides a picture or video image of an area near to the interior side 32b of garage door 32. Similarly, the interior camera 46 is operably coupled to control unit 42, and provides picture or video images of the exterior side 32a of garage door 32. As explained later, the video from the interior camera 44 and exterior camera 46 are provided to the user of a door monitoring system 20 via network 12. This allows the user to view and store images of the areas near to the garage door 32 just prior, during, and after a command to remotely actuate garage door 32. Finally, the door status sensor 48 is operably coupled to control unit 42 and provides the control unit with information regarding the position of garage door 32. Examples of a door status sensor 48 include a magnetic sensor, an optical sensor, cameras, or other means known in the art for determining the relative position of a door. Likewise, it can be understood by those skilled in the art that some embodiments of door monitoring system 20 use the interior camera 44 and exterior camera 46 in place of door status sensor 48 to provide control unit 42 with the relative position of garage door 32.

Other embodiments of door monitoring system 20 comprise a recorder 50 operably coupled to control unit 42. Recorder 50 is a recording device and provides a means for recording various forms of information gathered or used by door monitoring system 20 including: pictures and video provided by the interior camera 44 and exterior camera 46; commands entered into the door monitoring system 20; logs of door activities and remote accesses to the door monitoring system 20; system profile data, programs, user data, and any other information that may occur to one skilled in the art. As a feature, recorder 50 comprises various methods for storing and managing information. Illustratively, in one mode of operation, the stored information is retained for a fixed period of time. For example, in one mode of operation recorder 50 retains the stored information for 30 days. Yet another mode of operation of recorder 50 retains the stored information for 60 days. Still another mode of operation of recorder 50 deletes the stored information on a needs basis similar to a circular buffer memory; wherein, the most recent information replaces the oldest information. Other information management techniques include prioritization of the stored information; wherein the least important information is deleted first. In some embodiments, recorder 50 is a hard drive. As a non limiting example, embodiments of recorder 50 include: CD drives; read-write CD drives; floppy drives; tape recording devices; dynamic memories; static memories; or programmable memories. Likewise, some embodiments of recorder 50 comprise combinations of dynamic and programmable memory. Example memory types include, but are not limited to: SDRAM; RAM; DRAM; SRAM; RAM BUS; or flash memory. In addition, other embodiments of recorder 50 comprise programmable and/or removable memory systems. As a non-limiting example, this includes: flash drives; thumb drives; tape; flash; thumb drives; flash thumb drives; magnetic tape; optical discs; CD's; floppies; or portable hard drives. In addition, some embodiments of recorder 50 comprise remote or networked storage devices.

Although not shown in FIG. 1, some embodiments of door monitoring system 20 further comprise a means for playing back and displaying the video, pictures, and information stored on recorder 50. Illustratively, some embodiments include interfaces to TVs, computers, computer monitors, display units, projectors, web browsers, java applications, printers, cell phones, PDA devices, and other i/o devices as may occur to those skilled in the art.

Among other features, in some embodiments, control unit 42 comprise, for example, microprocessors, computers, microcontrollers, state machines, FPDA's, and other programmable logic devices. Some embodiments of control unit 42 also include logic units, static and dynamic memories, ROM, RAM, and flash. Likewise, control unit 42 may include interfaces to exterior memory systems: SRAM; DRAM; SDRAM; RAM BUS; flash; hard drives; CD drives; floppy drives; and other similar means of providing for memory access and storage. Other embodiments of control unit 42 comprise various I/O, networking and user interfaces including touch pads, means for data entry, display, display interfaces, networking interfaces, timers, clocks, internal clocks, counters, interrupt controllers, and communication ports as would be understood by those skilled in the art. In yet other embodiments, control unit 42 is a PC, laptop PC, programmable calculator, programmable machine, cellular telephone, or other networked appliance. In addition, control unit 42 may further comprise methods for tracking and updating the time of day. Illustratively, one feature of control unit 42 allows a user to enter the local time. In another mode of operation, control unit 42 updates an internal clock by obtaining the time from a networked device; for example, downloading the time of day from a web site linked to the official U.S. time of day or a cellular telephone network 26.

Embodiments of control unit 42 also include built-in peripheral interfaces. Illustratively, in some embodiments, control unit 42 includes an on-board modem for connecting to various network systems. Example network connections include: phone lines; cellular network; cable networks; wireless networks; DSL networks; satellite systems; Ethernet networks; optical networks. It will be understood that some embodiments of network 12 comprise the telephone system. Potential network connections include interfaces to wireless, wired, or optical networks. Illustratively, control unit 42 may include network connections comprising Blue Tooth™, IRDA™, IEEE 802.11(a, b, f, g). Still other embodiments of control unit 42 include interfaces to home networking systems based upon Smarthouse™, CE Bus™, and Home Bus™. Likewise, in some embodiments, control unit 42 is integrated into a home automation system.

As shown in FIG. 1, some embodiments of door monitoring system 20 comprise an exterior modem 52 operably coupled to control unit 42; wherein, modem 52 is operably coupled to network connection 12 and/or phone line 56. In addition, some embodiments of control unit 42 include an interface operably coupled to a computer 60. Likewise, computer 60 may be either operably coupled to modem 52 or directly coupled to network connection 12.

As a non-limiting example, at least one embodiment comprises modem 52 coupled to at least one wide area network including: telephone; cellular telephone; ATM; Ethernet; DSL; satellite; or cable. Modem 52 provides a network interface to network 12 for control unit 42 and, in some embodiments, computer 60. As explained later, this allows control unit 42 to interface with other network appliances including, but not limited to, a cellular phone network 26 or internet connections.

In some embodiments, computer 60 is a PC or laptop PC. However, in other embodiments, computer 60 is either a hand-held computing device, such as a PDA, cell phone, or other networked appliance. Computer 60 may interface with control unit 42 by either a wireless or hardwired interconnection. A non-limiting example list of potential interfaces includes IR, optical, RF, serial port, and USB.

In still other embodiments, control unit 52 is operably coupled to an override switch 58 having a system enable state and a system disable state. Asserting override switch 58 places the door monitoring system in a system override state, which allows the user to selectively disable features of the door monitoring system 20 while not disabling other command, control and monitoring features and functions. De-asserting override switch 58 places door monitoring system in the system enable state. As a non-limiting example, implementations of override switch 58 include optical, toggle, or contact switches. In some embodiments of the door monitoring system 20, the override switch 58 is incorporated into a separate control panel, not shown here, or within other control mechanisms integrated into the control unit 42, computer 60, or garage door opening 30.

In addition, some embodiments of control unit 42 are operably coupled to a light sensor 62. The light sensor 62 allows the door monitoring system 20 to sense the ambient light in a desired region or area. Non-limiting example embodiments of light sensor 62 comprise photo diodes or solar cell. In still other embodiments, a camera detects the ambient light level within an area or region of interest. For example, the video from the exterior camera 46 is used to sense the ambient light level on the exterior side 32a of the garage door 32. In some embodiments, control unit 42 selectively chooses between control parameters based upon the ambient level of light detected by light sensor 62.

Some embodiments of door monitoring system 20 further comprise a garage door opener antenna 64 operably coupled to garage door opener 30. Likewise, some embodiments include an antenna 66 operably coupled to control unit 42. This provides a means of communication between control unit 42 and garage door opener 30.

In addition, in some embodiments, antenna 66 of control unit 42 is used to operably couple the door monitoring system 20 to a cellular phone network 26. This allows the door monitoring system 20 to communicate directly with cell phone 22 or networked appliances 28.

Yet another feature of door monitoring system 20 further includes a server application. This allows a remote user to interface with door monitoring system 20 by logging onto a server (not shown) attached to network 12. The server acts as an interface to door monitoring system 20. The server application comprises, among other features, a user interface comprising: Video or pictures from door monitoring system 20; command functions; and monitoring functions. The server functionality can be either in integrated into control unit 42 or a separate network device attached to network 12.

Illustratively, in at least one embodiment, the server function runs on a remote server connected to network 12. The user contacts the server by directing a web browser to a web site comprising a user interface with a login prompt. Upon logging into the server, the server provides the user with a user interface to a specified door monitoring system 20. The server also contacts the door monitoring system to be controlled and obtains relevant status information and initiates a picture or video session; wherein, video or pictures of the area or regions near the garage door are provided to the server. The server them provides the video and status information either directly or indirectly to the user client. For example, the server can re-transmit the received video or pictures to the user client. Alternatively, the server can configure the user client to receive the video stream or pictures directly and the door monitoring system to provide the user client the video stream or picture directly.

Figure 2:
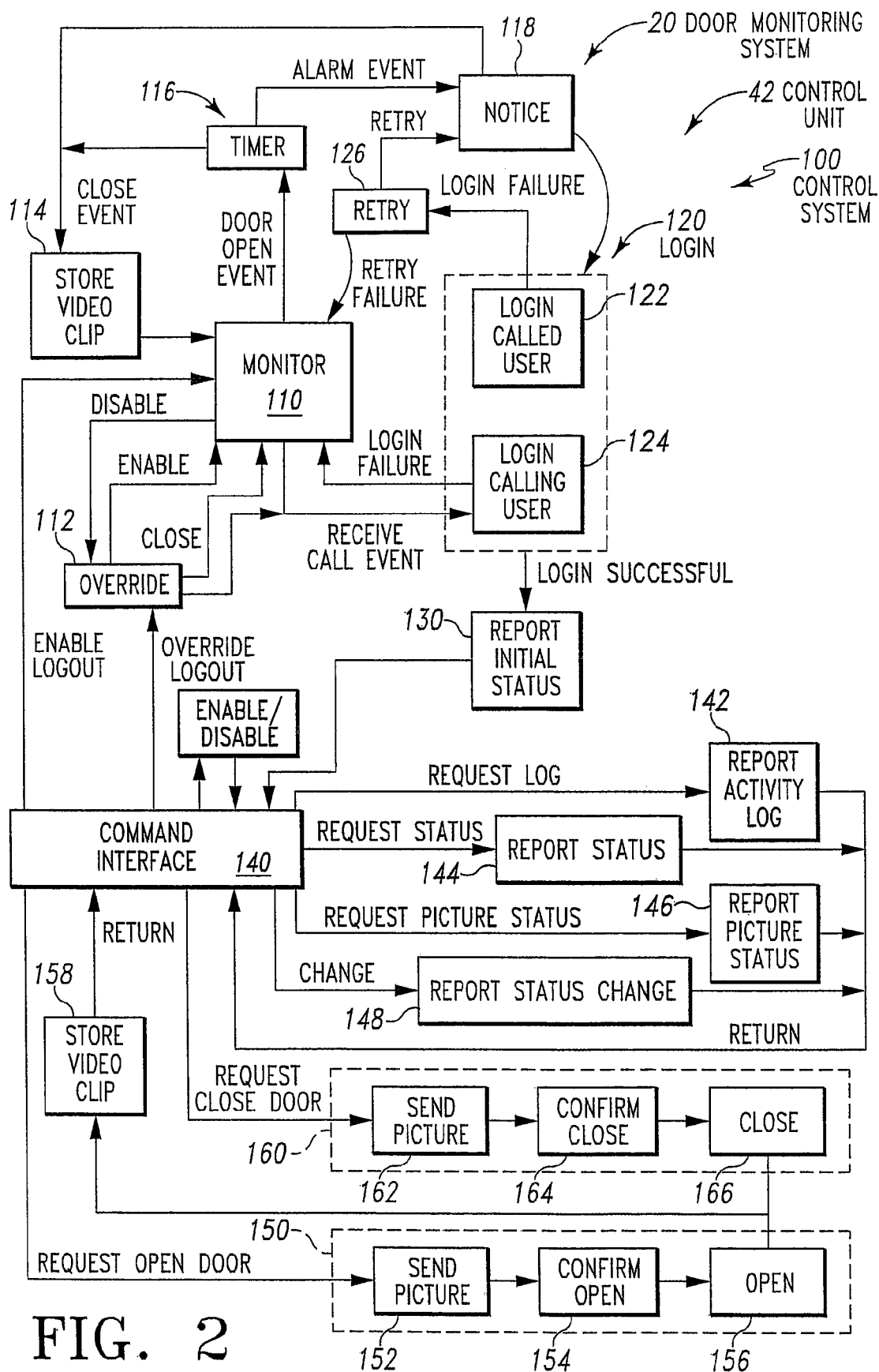
FIG. 2 is a flow diagram of one embodiment of a door monitoring system useful with the embodiment of FIG. 1.

Another aspect of door monitoring system 20 is illustrated as a flow diagram in FIG. 2. As discussed, with continuing reference to the elements in FIG. 1, the flow diagram of FIG. 2 comprises a portion of the operation of control unit 42, portions of the elements of door monitoring system 20, and door monitoring system 20 generally. As illustrated in FIG. 2, one embodiment of door monitoring system 20 is control system 100. At "monitor" 110, control system 100 monitors the state of door status sensor 48, the network interface to control unit 42, override switch 58, and light sensor 62.

In some embodiments of control system 100, at "monitor" 110, control unit 42 senses the level of light detected by light sensor 62. Based on the detected level of light, control unit 42 selects parameters used by control system 100 including: prioritization notification parameters; timer alarm period parameters; and notification message destination parameters.

Illustratively, some embodiments of control system 100 include user parameters for specifying and prioritizing notification message destinations. An example, but not exhaustive, list of potential message destinations includes: an email address; phone number; cell phone number; pager; internet connected client; internet connected server; or other network destinations. When control unit 42 detects that door status sensor 48 is in the door open state for a period of time exceeding a timer alarm period parameter, indicating the monitored entrance is open, door monitoring system 20 sends a notification message to a desired message destination using a message format compatible with the user's networked device 28 or cell phone 22. For example, control unit 42 may generate a phone call to a user's cell phone 22. Control unit 42 then generates a voice message to the use indicating a door is open and provide the user with the opportunity to log onto door monitoring system 20 to close the door.

Other embodiments of control system 100 allow a user to select or set various time related parameters affecting the door monitoring system 20. This may include a parameter specifying a time alarm period parameter wherein a timer of control unit 42 generates an interrupt event after the door is open for a period of time: the interrupt event causes the control system to generate a notification message to a desired message destination. In addition, some embodiments allow a user to specify different timer alarm period parameter values depending upon the time of day, day of week, vacation period, out of town travel period, ambient light level detected by light sensors 62, or some other condition of interest. By way of example, a user may specify a first timer alarm period parameter value for the weekend, a second timer alarm period parameter value for the week day, and a third timer alarm period parameter value for week day evenings.

In addition, at "monitor" 110, control unit 42 monitors override switch 58 to determine whether the user has placed the door monitoring system 20 in an "override" 112. As shown in FIG. 2, when override switch 58 is asserted, control unit 42 generates a disable event to control system 100. This causes control system 100 to transition to "override" 112, placing door monitor system 20 in the system override state. While in "override" 112, control system 100 disables at least one of the features of the door monitoring system 20. Illustratively, in some embodiments, the notification feature of the door monitoring system 20 is disabled while still allowing a remote user to log onto door monitoring system 20 and execute other commands or monitor the system.

Control system 100 remains in "override" 112 until control unit 42 detects either an enable event, closed event, or received call event. An enable event occurs when the user toggles the override switch 58 to the system enable state, which cause door monitoring system to enter the system enable state and re-enables the previously disabled. In addition, as discussed later, a user may assert an enable event command via "command interface" 140. Similarly, control system 100 transitions from "override" 112 to the "monitor" 110 upon detecting a close event, which occurs when control unit 42 detects that the door status sensor 48 is in the closed door state. Likewise, some embodiments of control system 100 transition from "override" 112 to "login calling user" 124 of login 120 upon a received event; a received call event occurs when a user contacts door monitoring system 20 to initiate a command and/or monitoring feature. Illustratively, in some embodiments, the user initiates a cell phone call door monitoring system 20. Upon receipt of the call, control unit 42 initiates a call event. This allows a remote user to interface with the door monitoring system 20 even when the control system 100 is in "override" 112.

Also, some embodiments of control system 100 include a maximum override period parameter. This allows control unit 42 to assert an enable event to control system 100 after the door monitoring system is in "override" 112 for a period of time equal to the maximum override period. Illustratively, when control system 100 enters "override" 112, control unit 42 enables a count down timer that creates an interrupt event after a time equal to the maximum override period parameter. When the timer expires, control unit 42 generates an interrupt to the control system 100, which causes control system 100 to transition from the "override" 112 state to the "monitor" 110 state. As a result, door monitoring system 20 re-enables the notification feature of the door monitoring system 20.

At least one embodiment of door monitor system 20 includes a notification feature wherein the system sends a notification message to a user at a desired notification message destination when the door is open for a specified period of time. Illustratively, the door monitoring system calls a user-specified cell phone to provide a set of notification messages and/or options. Returning to "monitor" 110 state, one embodiment of the notification feature comprises the control system 100 transitioning to "timer" 116 upon the assertion of a door open event, which occurs when control unit 42 senses that the door status sensor 48 is in the door open state. Control system 100 remains in "timer"116 until either a closed event or a timer alarm period event occurs. A close event occurs when control unit 42 detects that door status sensor 48 is in the door closed state. Upon a close event, control system 100 transitions from "timer" 116 to "store video clip" 114. While in "store video clip" 114, control unit 42 causes recorder 50 to record the video or pictures delivered by the interior camera 44 and exterior camera 46 during the periods just prior, during and after the actuation of the door. Control system 100 then transitions back to "monitor" 110.

Otherwise, when control system 100 enters "timer" 116, control unit 42 sets a timer to create an interrupt event after the expiration of a period of time equal to a timer alarm period parameter. Upon expiration of the timer, control unit 42 creates an interrupt that causes control system 100 to transition to "notice" 118. Although not shown in FIG. 2, alternative embodiments of control system 100 transition from "timer" 116 to "override" 112 when a disable event occurs.

At "notice" 118, control unit 42 attempts to inform a user that the door being controlled was open for a period of time greater than the timer alarm period parameter. In some embodiments, control unit 42 generates a message to a primary message destination. In other embodiments, control unit generates messages to both primary and alternative message destinations. In still other embodiments, control unit 42 makes a first attempt to contract a user at a first preferred message destination; however, if the first attempt is unsuccessful, control unit 42 uses at least one other preferred alternative message destination to contact the user. Although not shown in FIG. 2, some embodiments of "notice" 118 include a maximum attempt parameter wherein the control system 100 returns to the monitor system 110 after making a maximum number of attempts to contact the user. This causes control system 100 to restart the notification feature.

Some embodiments of door monitoring system 20 provide a user interface that allows the user to specify a series of message destinations including prioritization parameters. The prioritization parameters allow control unit 42 to select a preferred destination for the notification message. In addition, some embodiments of door monitor system 20 allow a user to specify a variety of notification message destinations. In other embodiments a user can specify alternative destinations. A non-limiting example list of potential notification message destinations includes: cell phone numbers, telephone numbers, voice mail, voice messaging systems, pagers, email, or internet application messages. Illustratively, in at least one embodiment, control unit 42 generates a voice-based phone call to a user's cell phone 22, and provides the user with a voice message prompt. The voice message prompt informs the user that the caller is a door monitoring system and requesting that the user log onto the system. If the attempted notification is unsuccessful, the door monitoring system selects another message destination. For example, this may include sending a text message to a pager or email system, sending a video email message comprising a picture or video clip from interior camera 44 and exterior camera 46 to a user's email address, or calling an alternative phone number.

As shown in FIG. 2, control system 100 transitions to "login" 120 upon making contact with a user using a network appliance capable of logging onto the door monitoring system 20. Upon entering login 120, control system 100 transitions to "login called user" 122. While in "login called user" 122, control unit 42 executes an algorithm requesting that a remote user provide an response to allow the user to utilize the resources of door monitoring system 20. In some embodiments, the remote user logs onto the door monitoring system 20 by providing a key sequence. The pass code may be numeric, alphanumeric, alpha characters. In more secure systems techniques using biometrics are employed. As a non-limiting example, this includes scanning fingerprints or retinal images. In other embodiments, control unit 42 includes a means for voice recognition, which allows a user to log onto the door monitoring system 20 by providing a voice response. In still other embodiments, the user provides a combination of at least one key word or code and voice responses to gain entry into the door monitoring system 20. Upon a login failure event, control system 100 transitions to "retry" 126. At retry 126, the control unit 42 determines whether an alternative message destination is specified and whether that alternative address was previously contacted. If an unused alternative address is available, control unit 42 issues a retry event, which causes control system 100 to transition back to "notice" 118 and make another attempt to contact the user using the alternative message destination. However, if no alternative message destination is specified, all the primary and alternative message destinations were previously tried without success, or the previous attempt to contact all of the primary and alternative destination addresses failed, control system 100 transitions to "monitor" 110. This results in a delay period of time before a new notification attempt occurs because control system 100 must first pass through "timer" 116 prior to re-entering into "notice" 118.

Upon a successful entry of a user pass code or voice identification message, control unit 42 issues a login successful event, which causes the control system 100 to transition to "report initial status" 130. While in the "report initial status" 130 state, the control unit provides the user with either voice or text messages, compatible with the user interface of the receiving device, regarding the status of the door monitoring system. Illustratively, in some embodiments, door monitoring system 20 generates a voice message to a user via cell phone 22, that indicates garage door 32 is in an open state for a period of time longer than the timer alarm period parameter. In another mode of operation, illustratively when interfacing with a user's networked device that does not have a video screen, a voice, audio or text alert message is generated requesting the user call door monitoring system 20. After generating an initial report status for the user, control system 100 transitions to "command interface" 140.

At "command interface" 140, control unit 42 generates a user interface to allow a remote user to control and monitor the features and functions of the door monitoring system 20. In some embodiments, the user interface provides a text message interface to the remote user. In still other embodiments, control unit 42 generates a series of voice messages as part of the user interface. In addition, control unit 42 provides navigational instructions as well as responses to allow the user to select among a variety of commands or request various status reports concerning the state of the door monitoring system 20 and the door under control. Illustratively, at least one embodiment of "command interface" 140 generates status reports comprising: "report activity log" 142; "report status" 144; "report picture status" 146; and "report status change" 148. In addition, in at least one embodiment, the "command interface" 140 includes: "door open command" 150, "door close command" 160; and "enable/disable" 170.

At "report activity log" 142, control unit 42 interfaces with its memory, including but not limited to the memory associated with recorder 50, to generate a log of the various activities that have occurred during a specified period of time. Illustratively, at least one embodiment of "report activity log" 142 comprises control unit 42 generating a series of voice messages to inform the remote user of the previous activity associated with the door under control, including: use of the door monitoring system; attempts to log onto door monitoring system 20; actuations of the door under control; and failed and successful login events. In other embodiments, the control unit also provides the report activity log in a series of text messages. In the case where the user is utilizing a web-based application, such as a browser or java applet, the door monitoring system 20 generates a web displayable or playable report to the user. In addition, some embodiments of "report activity log" 142 allow a user to request an email delivery of the report activity log. Upon completion of sending the report activity log, control system 100 returns to the "command interface" 140.

"Command interface" 140 also allows a user to request an updated status report, which results in a request status event to control system 100. As a result, control system 100 transitions to "report status" 144. At "report status" 144, control unit 42 generates a status message regarding the position of the door under control. Illustratively, in at least one embodiment, control unit 42 generates a voice message to the user indicating that the door is in the open or closed state and whether the door monitoring system is in the override state. However, in some embodiments, the control unit 42 also reports that the door is in an indeterminate mode or is in the process of transitioning from either a closed to open state or an open to closed state. Similar to the "report activity log" 142, door monitoring system 20 provides text, voice, or a combination of text and voice messages to the user, depending upon the interface employed by the remote user. Illustratively, in one embodiment, door monitoring system 20 provides both a voice and text message to a user's cell phone, indicating the status of the door monitoring system 20. Alternatively, door monitoring system 20 provides a text message to a user's interface device that is capable of receiving a text message. After providing the requested status report, control system 100 returns to "command interface" 140.

Some embodiments of door monitoring system 20 include a feature that allows the user to request a picture or video clip of the area surrounding or near to the interior and exterior of the door under control. Upon receiving a user's request to view the area near to the door, control unit 42 generates a request picture status event to control system 100. As a result, the control system 100 transitions from "command interface" 140 to "report picture status" 146. This causes control unit 44 to create a video or picture message containing the present displayable video or pictures from interior camera 44 and/or exterior camera 46. The video based message is then provided to the user via network 12.

Illustratively, in one embodiment, control unit 42 obtains the pictures or video from the interior camera 44 and exterior camera 46, and compresses the video images using a video compression system adapted to the user's network appliance. Door monitoring system 20 sends the compressed images via network 12 to the user, whereupon the image is displayed on a video/picture screen 24. Various modes of displaying images of the areas near the interior and exterior sides of garage door 32 are contemplated. In one mode of operation, the display of the images of the areas near the interior and exterior sides of the garage door are shown simultaneously, for example, in a side by side fashion. In another mode of operation, the images of the interior and exterior sides of the garage door alternate. Another embodiment of control unit 42 provides a text message to the user device to inform the user of the present status of the door monitoring system. In another embodiment, control unit 42 provides the requested video images and generates a voice message "system is disabled" to inform the user that the door monitoring system is currently in the override mode. After providing the requested pictures and status of the door monitoring system 20, control system 100 returns to "command interface" 140.

In some embodiments of "command interface" 140, control unit 42 generates a change event when the status of the door under control changes while the user is interfaced to the door monitoring system 20. In one example, an initial status report generated by "report initial status" 130 indicates that the door under control is in the open state. Thereafter, control unit 42 detects that the door status sensor 48 has transitioned from the open door status to close door status while the user is logged onto the door monitoring system. As a result, control unit 42 generates a change event interrupt. This results in the control system 100 transitioning from "command interface" 140 to "report status change" 148. While in the "report status change" 148, control unit 42 generates an updated status report similar to the status report provided by "report status" 144. In other embodiments, control unit 42 generates an updated status report similar to report picture 146. After providing the updated status report, control system 100 transitions or returns to "command interface" 140.

In addition to the status reporting features of door monitoring system 20, "command interface" 140 also allows the user to place the door monitoring system 20 in either the override mode or to re-enable the system upon exiting back to "monitor" 110. In one embodiment, the user instructs door monitor system 20 to transition from the override state into the enabled state. Upon receiving the request, control unit 42 generates a change override event, which causes control system 100 to transition from "command interface" 140 to "enable/disable" 170. At "enable/disable" 170, control system 100 then sets a parameter that causes control unit 42 to generate an override log out event when exiting "command interface" 140. As a result, control system 100 first transitions to "override" 112; and subsequently, control system 100 transitions back to "monitor" 110 without further intervention and re-enables the reporting function of door monitoring system 20. In some embodiments, control system 100 transitions directly to "monitor" 110 and another means if used to ensure the system's state variables are properly reset. Alternatively, the user may also disable the reporting feature. This causes control system 100 to return to "override" 112 upon exiting "command interface" 140.

At least one embodiment of "command interface" 140 provides a means for a remote user to generate a command requesting that the door under control be opened or closed. Upon receiving a user request to open a door, control unit 42 generates a request open door event, which results in control system 100 transitioning from "command interface" 140 to "door open command" 150. Similarly, a user request to close the door under control causes control unit 42 to generate a request close door event, which results in the control system 100 transitioning from "command interface" 140 to "close door command" 160. Upon exiting from either the "open door command" 150 or "close door command" 160, control system 100 transitions to "store video clip" 158. Similar to "store video clip" 114, at "store video clip" 158, control unit 42 instructs recorder 50 to store the video images generated by interior camera 44 and exterior camera 46. Control unit 42 commands recorder 50 to store a desired period of time prior to the actuation of the door under control. The time periods recorded may include: before the door actuates, while the door is actuating, and after the actuation of the door. Following this, control system 100 returns to "command interface" 140.

Returning to the "open door command" 150, the control system 100 initially enters "send picture" 152; wherein, the door monitoring system provides the remote user a picture of the interior and exterior regions or areas near to the door under control. After the pictures are downloaded to the user, control unit 42 is enabled to close the door via the operation of garage door opener 30. In some embodiments door monitoring system 20 employs a verification step that requires either the user or the user's networked device to confirm receipt of the video or pictures. After the downloading of the interior and exterior pictures or video to the remote user's networked appliance, control system 100 transitions to "confirm open" 154; wherein, the door monitoring system 20 requests the user reconfirm the command to actuate the door. This is done to ensure that the user has an opportunity to view the pictures or video of the surrounding area near to the door prior to actuating the door. Upon receiving a conformation of the open door command, control system 100 transitions to "open" 156. At "open" 156, control unit 42 operably controls the garage door opener 30 to actuate the door under control, here garage door 32. Control system 100 then transitions to "store video clip" 158 before returning to "command interface" 140.

Figure 3:
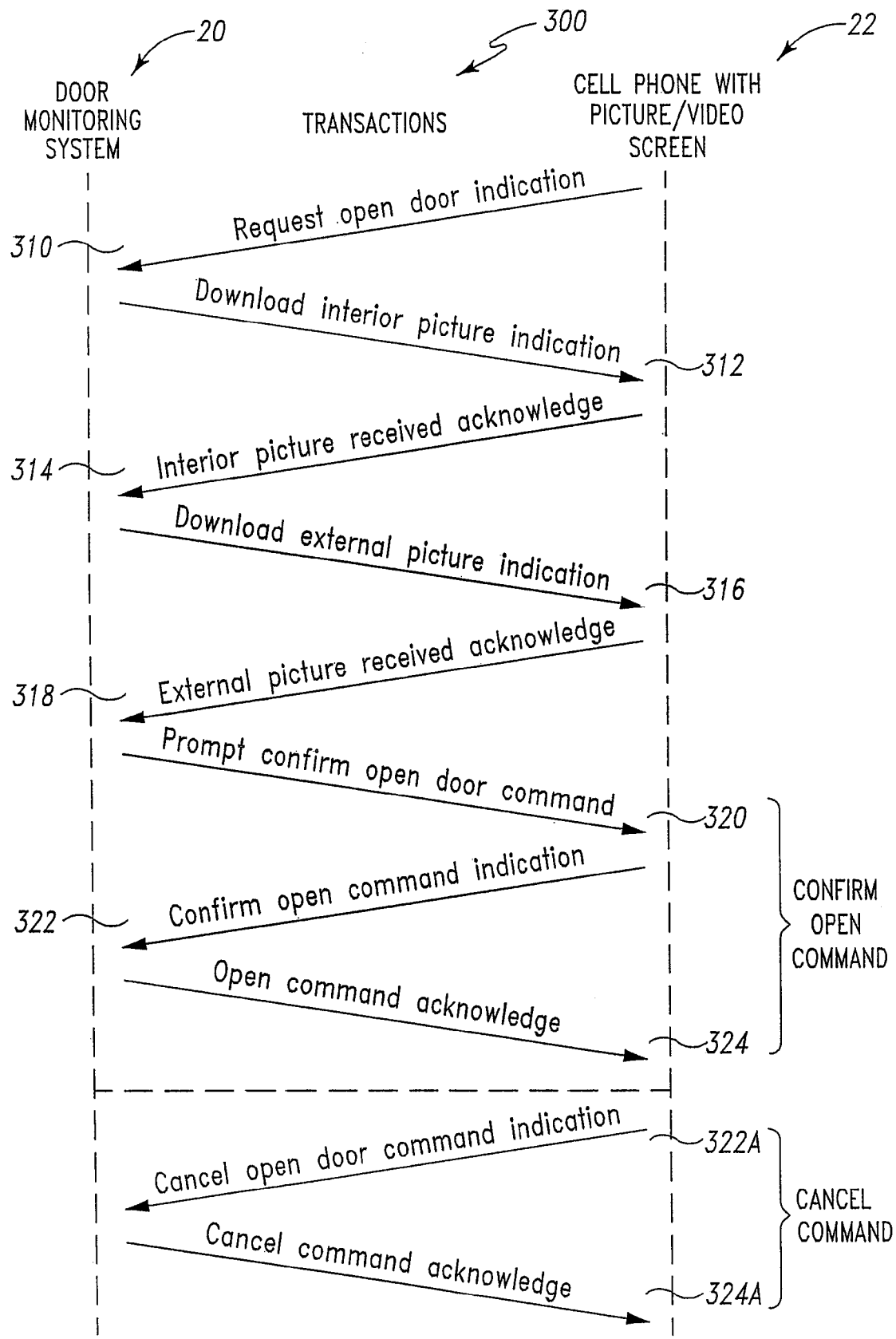
FIG. 3 is an embodiment of a message transaction diagram for remotely opening a garage door with a door monitoring system useful with the embodiments of FIG. 1 and FIG. 2.

One embodiment of door open command 150 is shown in FIG. 3 as a message transaction diagram 300 between door monitoring system 20 and a remote user device. The following description is with continuing reference to door monitoring system 20 of FIG. 1 and control system 100 of FIG. 2. As shown in FIG. 3, the remote user device is cell phone 22 with a picture or video display capability; however, it is understood that other networked appliances are also intended. At 310, the user initiates a "request open door indication" using cell phone 22. Upon receiving the "request open door indication" 310, control system 100 transitions to "send picture" 152. As a result, control unit 42 captures the video from interior camera 44 and generates a "download interior picture indication" 312 to cell phone 22.

The user's cell phone displays the received pictures or video upon the video picture screen 24 of cell phone 22. In at least one embodiment, cell phone 22 automatically generates an "interior picture received acknowledgment" 314 back to the door monitoring system 20. This allows the door monitoring system 20 to ensure that the user received the image and had an opportunity to view the areas or region near to the interior side 328 door under control, here garage door 32, prior to completion of door open command 150. In other embodiments, the user generates the interior picture received acknowledgment 314 by a key press or voice acknowledgement. However, some embodiments do not require an interior picture received acknowledgment 314. Upon receiving the interior picture received acknowledged 314 message, control unit 42 generates a "download exterior picture indication" 316 using the video from the exterior camera 46. After completing the download, cell phone 22 generates an "exterior picture received acknowledgment" 318 to the door monitoring system 20. Similar to the interior picture received acknowledgment, some embodiments generate an automatic response. Other embodiments require a user-initiated response, and (not shown) other embodiments do not require an "exterior picture received acknowledgement" 318.

Receiving the "exterior picture received acknowledgment" 318 causes control unit 42 to generate an interrupt to control system 100 indicating that cell phone 22 has successfully downloaded or received video images recorded by the interior camera 44 and exterior camera 46. As a result, control system 100 transitions to "confirm open" 154. Control unit 42 then generates a prompt requesting the user provide a "confirm open door command" 320. The message generated by control unit 42 may be either text, voice, tone, graphical, or any other means capable of communicating to the user that the door monitoring system 20 desires the user to confirm the "open door command" 150.

In the event that the user desires to complete the "open door command" 150, the user provides a "confirm open command indication" 322 to door monitoring system 20. For example, in one embodiment the message comprising a "confirm open command indication" 422 comprising the user saying the word "yes" into the microphone of cell phone 22. Alternatively, a user provides a confirm open command indication 422 by entering a key press. Upon receipt of a message confirming the open door command, control system 100 transitions to "open" 156, which results in control unit 42 commanding garage door opening 130 to actuate the door under control. In addition, control unit 42 generates an "open command acknowledge" 324 message to the user at cell phone 22. As previously described in relation to FIG. 2, control system 100 then transitions to "store video clip" 158 before returning to "command interface" 140.

However, the user terminates a close door command 150 by providing, as indicated by the user interface associated with the door monitoring system 20, a "cancel open door command indication" 322a. Illustratively, in one embodiment, the user generates a "cancel open door command indication" 322a by saying the word "cancel command" into the microphone or alternatively by pressing the indicated key of cell phone 22. Upon receipt of the "cancel open door command indication" 322a, control unit 42 generates a cancel command event to control system 100. In some embodiments, this causes control system 100 to transition to "store video clip" 158 to capture the video generated by interior camera 44 and exterior camera 46 for some time prior to and after receiving the cancel open door command indication. Although not shown in FIG. 2, in other embodiments, control system 100 transitions directly to "command interface" 140 without storing any pictures or video generated by interior camera 44 or exterior camera 46. In addition, in some embodiments, control unit 42 generates a cancel command acknowledgment message 324a. This message informs the user, either in text, voice, tone, graphics, or a combination thereof, that the "cancel open door command indication" 322a was received and that the door monitoring system 20 awaits further instructions.

Figure 4:
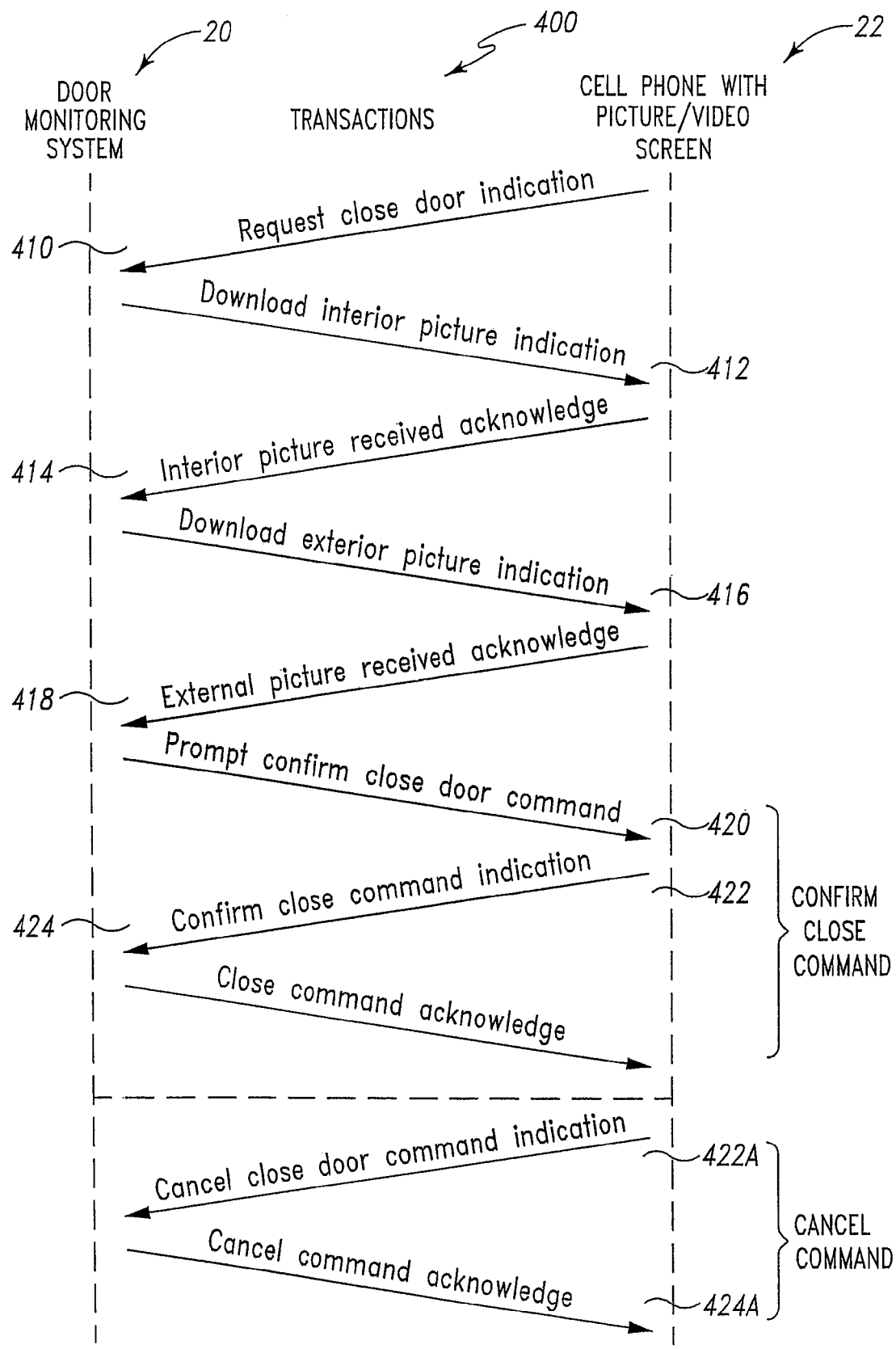
FIG. 4 is an embodiment of a message transaction diagram for remotely closing a garage door with a door monitoring system useful with the embodiments of FIG. 1 and FIG. 2.

Another aspect of control system 100 is an embodiment of door close command 160, illustrated in FIG. 4 as transaction diagram 400. Transaction diagram 400 shows the communications between door monitoring system 20 and a user remotely closing a door with a cell phone 22 having a picture/video screen 24. The following description is with continuing reference to door monitoring system 20 of FIG. 1 and control system 100 of FIG. 2. As shown in FIG. 4, the user initiates a "request close door indication" 310 to door monitoring system 20. Upon receipt, control unit 42 generates a request close door event, causing control system 100 to transition from "command interface" 140 to "close door command" 160. Upon entering "close door command" 160, control system 100 enters "send picture" 162. Similar to message transaction diagram 300 of FIG. 3, this causes control unit 42 to generate a "download interior picture indication" 412 to cell phone 22. The "download interior picture indication" 412 includes video or pictures generated by interior camera 44. After receiving "download interior picture indication" 412, cell phone 22 generates an "interior picture received acknowledgment" 414 message to door monitoring system 20, which indicates cell phone 22 successfully received the images. The interior picture received acknowledgment 414 causes control unit 42 to generate a "download exterior picture indication" 416 that includes the images or video captured by exterior camera 46. After completing the download process, cell phone 22 generates an "exterior picture received acknowledgment" 418 message to door monitoring system 20, which indicates that the cell phone 22 successfully downloaded the exterior picture provided by the exterior camera 46 to door monitoring system 20. In response, control unit 42 sends an indication to control system 100, indicating that the download process was successful, wherein control system 100 transitions to "confirm close" 164.

At "confirm close" 164, control unit 42 prompts the cell phone user to provide a "confirm close door command" 420. Similar to the prompt used in conjunction with the confirm "open door command" 150, the message from control unit 42 may comprise text, voice, graphical, or sound generation means that indicates to the user that an additional action is required in order to complete the "close door command" 160. As an added safety feature, the video from door monitoring system 20 can include a time stamp. The time stamp allows door monitoring system 20 to determine whether the user received the video or picture in a timely manner.

To complete the door close command 160, the user at cell phone 22 generates a "confirm close command indication" 422 as specified by the user interface of door monitoring system 20. Illustratively, in some embodiments, the user initiates a confirm close command indication 422 by making a verbal response to be interpreted by the door monitoring system 20. In other embodiments, the user at cell phone 22 requests the user to enter a numerical or alpha/numeric combination confirming the desire to continue with the close door command. In still other embodiments, the user provides a response associated with a text or graphical message embedded within either the interior picture, exterior picture, or both the interior and exterior pictures. Illustratively, in at least one embodiment, a pass code is placed within at least one of the downloaded pictures. In some embodiments the pass code is overlaid the video or picture. In other embodiments the pass code is placed within a portion of the border region associated with the picture. Illustratively, in some embodiments, the pass code is embedded as an overlay text. In other embodiments, the pass code is embedded using a translucent overlay technique. In still other embodiments, the pass code is displayed upon one of the borders of the downloaded picture following completion of the download process. Alternatively, some embodiments of door monitoring system 20 provide the pass code in a voice prompt.

Upon receipt of the "confirm close command indication" 422 by door monitoring system 20, control unit 42 generates an interrupt that causes control system 100 to transition to "close" 156. This results in control unit 42 generating a control signal to garage door opener 30 to actuate garage door 32. In addition, control system 100 transitions to "store video clip" 158; wherein, control unit 42 instructs recorder 50 to record the pictures or images generated by interior camera 44 and exterior camera 46 during the times just prior, during, and after the closing of the garage door 32. Following completion of the command, when door status sensor 48 indicates the garage door 32 is in the closed state, control unit 42 sends a "close command acknowledged" 424 to the user at cell phone 22 informing the user that the requested close door command was successfully completed. Alternatively, the user discontinues the close door command by sending a "cancel close door command indication" 422a to door monitoring system 20. Upon receipt of the "cancel close door command indication" 422a, control unit 42 sends a message to control system 100 indicating the user's desire to cancel the requested command. In some embodiments, this causes control system 100 to immediately transition to "command interface" 140. In other embodiments, as shown in FIG. 4, control system 100 transitions to "store video clip" 158 to record the time just prior and after receipt of the "cancel close door command indication" 422a. Finally, the door monitoring system 20 generates a "cancel command acknowledgment" 424a message to the user at cell phone 22 to confirm that the close door command was not executed and provide the user with an indication that the control system is now in "command interface" 140 mode of operation. Otherwise, door monitoring system 20 advantageously provides a method of tracking the passage of time after enabling the control unit function to remotely actuate the garage door and disabling the control unit function to remotely actuate the garage door after the passage of a time out period of time.

Figure 5:
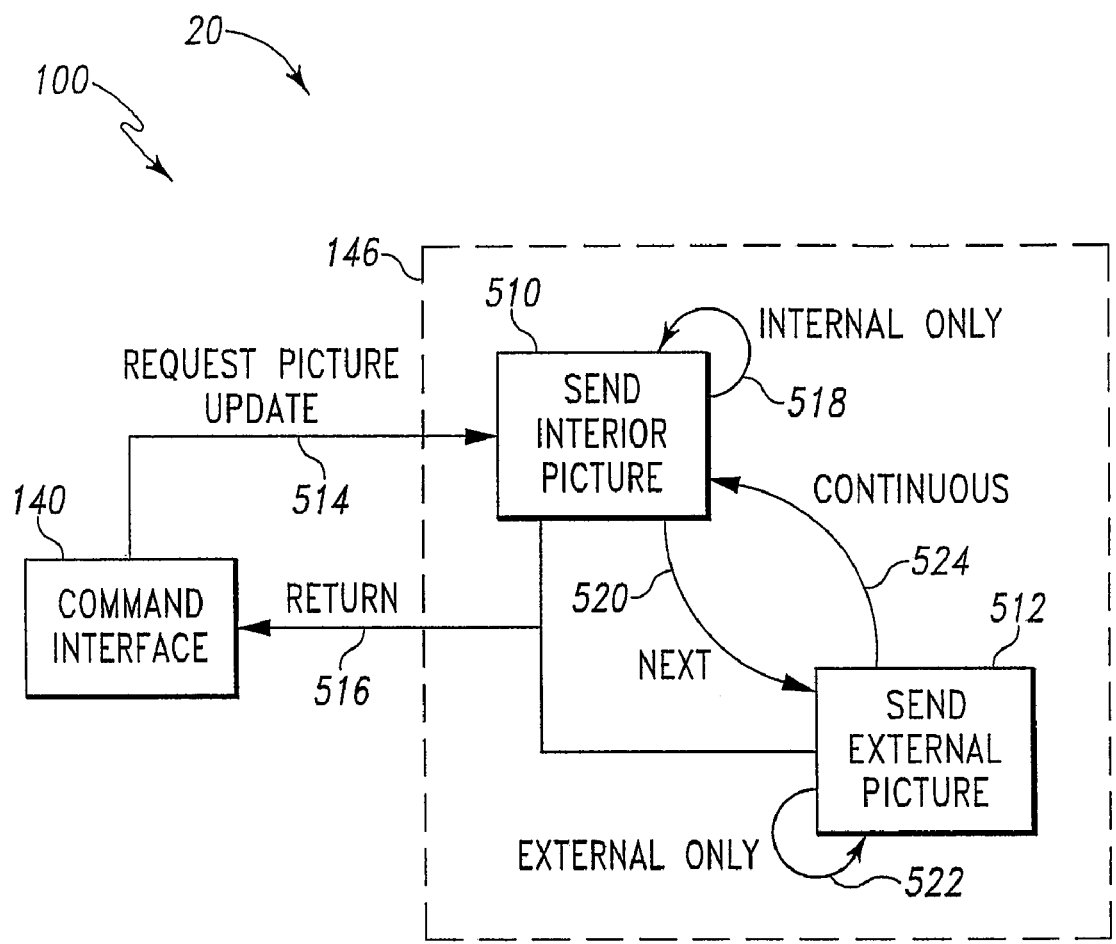
FIG. 5 is an embodiment of a state diagram for a feature allowing a user to remotely request a report picture status of a garage door from a door monitoring system, which can be associated with the diagrams shown in FIG. 1 and FIG. 2.

As shown in FIG. 5, with continuing reference to door monitoring system 20 of FIG. 1 and control system 100 of FIG. 2, one embodiment of the "report picture status" 146 feature is shown in FIG. 5 and includes "send interior picture" 510 and "send exterior picture function" 512. Initially the control system 100 is in "command interface" 140. Upon receiving a "request picture update" 514 from the user, control system 100 transitions to "report picture status" 146 and enters "send interior picture" 510. This causes the door monitoring system to sends an interior picture of the area or regions near to the interior side 32A of garage door 32.

In some embodiments, shown as "interior only" 518, the control unit 42 continues sending the pictures and video provided by interior camera 44. This continues until some intervening act by the user or the control system 100. Illustratively, in one embodiment, control system 100 exits the loop created by "interior only" 518 after a given number of frames. Alternatively, control system 100 exits the loop upon receiving a user generated key press or verbal command. In other embodiments, as shown as "next" 520, control system 100 transitions to "send exterior picture" 512 after control unit 42 indicates that a message containing an interior picture was sent to the user. In still other embodiments, control system 100 proceeds to "return" 516 after sending the interior picture.

At "send interior picture" 512, control unit 42 generates a message to the user's networked appliance 28 containing video or picture images from exterior camera 46. Similar to the "send interior picture" 510 process, in some embodiments control system 100 proceeds to "exterior only" 522, which causes control unit 42 to continually send video and pictures generated by exterior camera 46 until an intervening event occurs. Alternatively, in some embodiments, control system 100 proceeds to "return" 516 after control unit 42 indicates that the exterior picture or video has been sent to the user; this causes control system 100 to return to the "command interface" 140.

Still other embodiments of the door monitoring system 20 include a feature of sending alternating interior and exterior pictures or video segments to the user. Illustratively, after sending the exterior picture, control system 100 proceeds to "continuous" 524. This causes control unit 42 to send an updated interior picture provided by interior camera 44. After sending the interior picture, control system 100 proceeds to next 520, which results in control system 100 entering "send exterior picture" 512. This process then continues until some intervening event causes the control system to proceed to "return" 516, wherein control system 100 returns to "command interface" 140.

Figure 6:
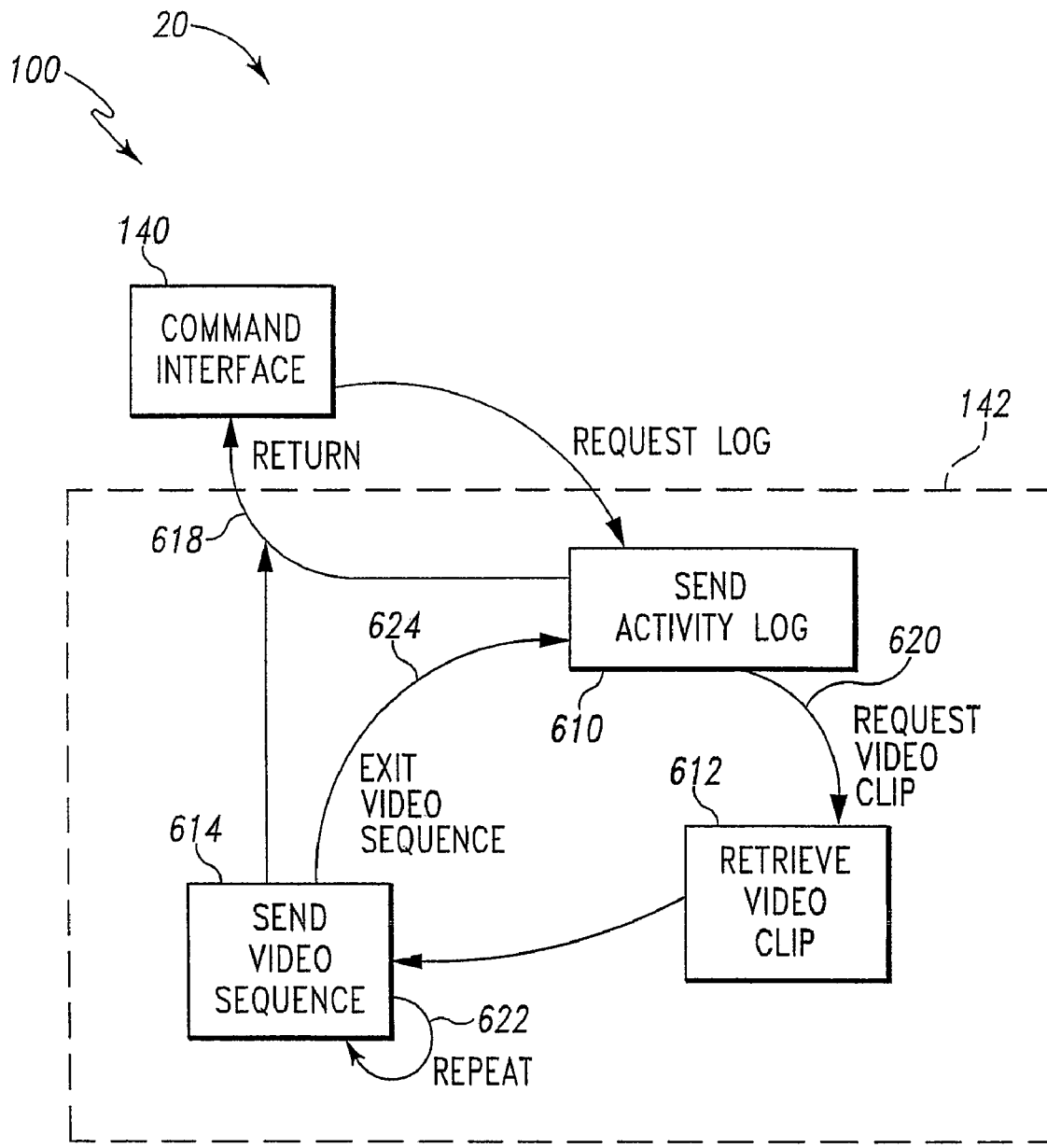
FIG. 6 is an embodiment of a state diagram for a feature allowing a user to remotely request a report activity log of a garage door from a door monitoring system, which can be associated with the diagrams shown in FIG. 1 and FIG. 2.

FIG. 6 shows one embodiment of "report activity log" 142 and is described with continuing reference to door monitoring system 20 of FIG. 1 and control system 100 of FIG. 2. Starting at "command interface" 140, a user initiates the "report activity log" 142 feature by sending a request log message via network 12 to control unit 42. Upon receipt, control unit 42 generates an interrupt, which causes control system 100 to transition to "report activity log" 142. Upon entering "report activity log" 142, control system 100 proceeds to "send activity log" 610. At "send activity log" 610, control unit 42 interfaces with memory including but not limited to recorder 50, to obtain information regarding the activities of the door monitoring system 20 and the portals under control of the door monitoring system 20. In some embodiments, the user interface of the door monitoring system 20 allows the user to specify various characteristics of the report generated to the user. Illustratively, at least one embodiment of door monitoring system 20 provides the user a method to specify a period of time of interest, activities of interest, attempted system login events, successful login events, unsuccessful login events, and the present status of the system. Other embodiments of "report activity log" 142 allow a user to request an accompanying video clip or picture associated with each event affecting door monitoring system 20 or the actuation of the portal under control. Illustratively, least one embodiment includes as a feature a user initiated "request video clip" 620 command. Upon receiving the "request video clip," control system 100 transitions to "retrieve video clip" 612. At "retrieve video clip" 612, control unit 42 interfaces with recorder 50 to retrieve the video or pictures generated by interior camera 44 and exterior camera 46 associated with the event of interest. After retrieving the video or pictures from memory, control system 100 proceeds to "send video sequence" 614. The control unit 42 sends a message to the user's networked appliance that contains the retrieved video clip or pictures. Some embodiments provide a "repeat" 622 option wherein control unit 42 sends additional copies of the previously retrieved video clip or sequence of pictures. In still other embodiments, control system 100 proceeds to "exit video sequence" 624 and returns to "send activity log" 610. Alternatively, after sending the requested video sequence, some embodiments of the send video sequence 614 feature proceed to "return" 618 after successfully downloading at least one sequence of video or pictures. This causes control system 100 to transition to "command interface" 140. Similarly, after the user completes reviewing the activity log, the user may initiate a return 618 process, which causes control system 100 to return to "command interface" 140.

In some embodiments of "report activity log" 142, door monitoring system 20 generates a text-based activity log. However, in other embodiments, the door monitoring system generates a set of voice messages to the user that report the activity log. In still other embodiments, door monitoring system 20 generates a combination of text, graphics, and voice messages to report the activity log. In addition, door monitoring system 20 uses a reporting means dependent upon the capabilities of the user's networked appliance. In addition, some embodiments of the system permit a user to interface with the activity log locally through either a display interface operably coupled to the door monitoring system, computer 60, a control panel (not shown) operably coupled to the system, or other means as would occur to one skilled in the art.

Returning to FIG. 1, some embodiments of door monitoring system 20 comprise a configuration and set up technique including interfacing computer 60 to control unit 42 and downloading various set up parameters. Illustratively, in some embodiments the user interface permits a user to specify an alarm phone number or notification destination address and an associated access or pass code. In addition, some embodiments of the user interface of the door monitoring system 20 permit a user to enter multiple notification addresses.

Yet other embodiments of the door monitoring system 20 include a feature that allows a user to specify from where a user may access the door monitoring system 20. Illustratively, some embodiments include a caller ID function to screen incoming calls to the door monitoring system. Control unit 42 screens the incoming calls, and permits only a user calling from a specified phone number to gain access to the command and reporting functions. Alternatively, other embodiments require the user to utilize a particular device, identified or identifiable by a static IP address, serial number, Ethernet address, ATM address, other similar identifying means.

In addition, some embodiments of control unit 20 comprise a call director feature. The call director feature comprises a method of sharing a phone line between a door monitoring system and other appliances using the same phone line. Illustratively, one embodiment of the call director is operably coupled to phone line 56 and further comprises a means for connecting phone line 56 to other devices in the structure that attach to the interior phone line (not shown). Example devices include phone sets, computer modems, voice mail, voice messaging systems, and fax machines. The call director senses the phone line to determine if there is an incoming call. Upon detecting that there is an incoming call, door monitoring system 20 answers the phone call by connecting to the phone line. Door monitoring system 20 listens for a remote command, distinctive ring or tone indicating the call is meant for the door monitoring system or another application sharing the phone line.

In the event that the call is not for the door monitoring system, the call director simulates a continuing ring for the calling party and generates a ring voltage as an output on the interior phone line. The call director then routs the call to the answering device on the interior phone line by connecting phone line 56 to the interior phone line.

Other embodiments of the call director comprise a feature for detecting "distinctive ring tones" signifying the incoming call is intended for door monitoring system 20. The distinctive ring tone allows door monitoring system 20 or another application to share phone line 56. Door monitoring system 20 does not answer calls not using the distinctive ring tone indicating a call into door monitoring system 20.

Alternatively, in the event that the call is not for the door monitoring system, the call director simulates a continuing ring for the calling party and generates a ring voltage as an output on the interior phone line. The call director then routes the call to the answering device on the interior phone line by connecting phone line 56 to the interior phone line.

Alternatively, the call director is operably coupled to the shared phone line and comprises a method comprising the steps of sensing the phone line to detect whether an incoming call is intended for the door monitoring system and connecting the door monitoring system's means for receiving and processing information received over a phone line to the phone line when the incoming call is intended for the door monitoring system.

Figure 7:
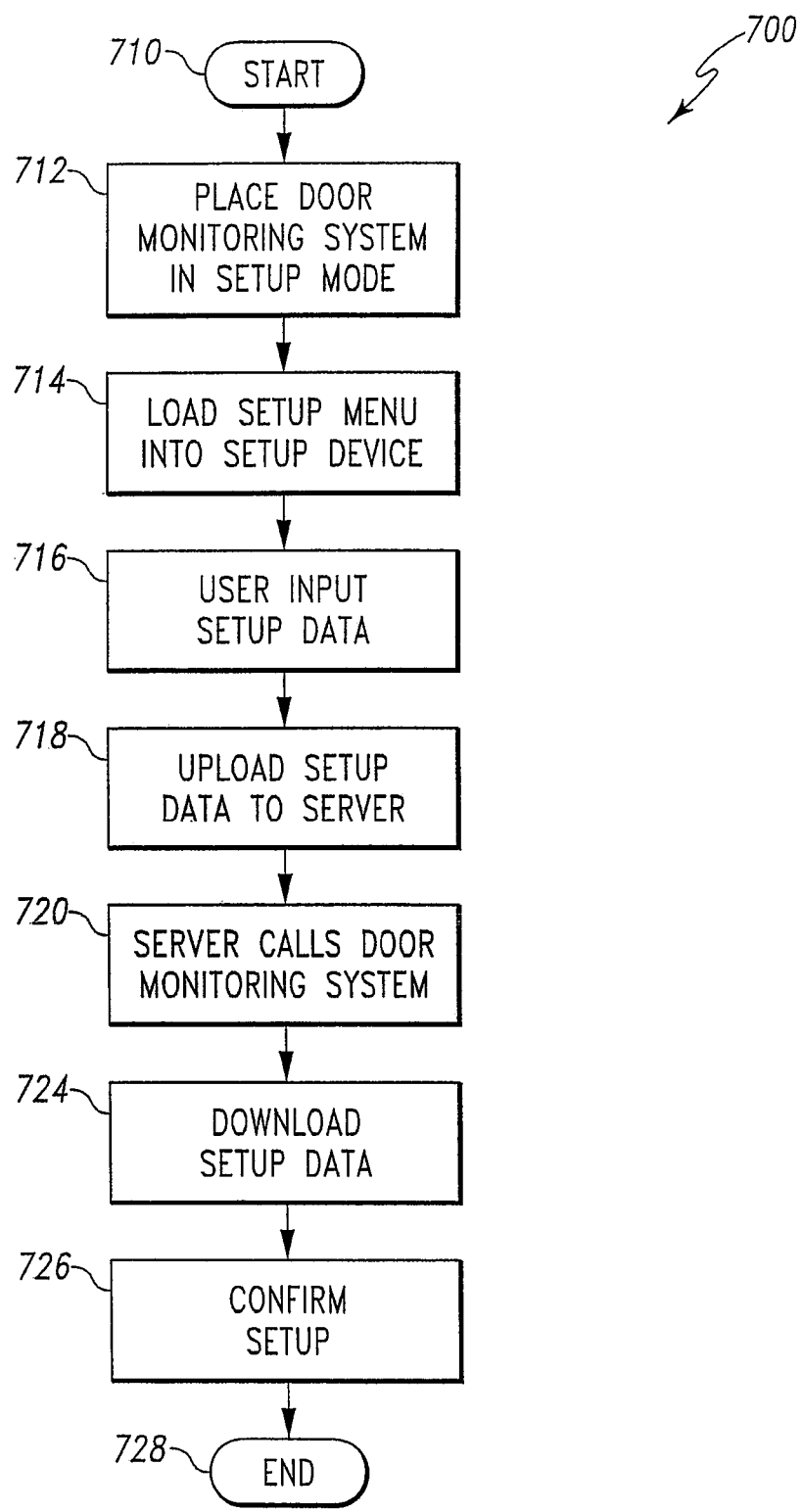
FIG. 7 is an embodiment of a technique for setting up and configuring a door monitoring system useful with the embodiment of FIG. 1.

The flow diagram of FIG. 7 describes a technique for setting up a door monitoring system 700 with continuing reference to the door monitoring system as illustrated in FIG. 1. Beginning at "start" 710, some embodiments of the door monitoring system 20 include a user placing the door monitoring system 20 in a "set up mode" 712. Illustratively, this can be done by a user holding a button or combination of buttons on a user interface panel operably coupled or incorporated into control unit 42 or the door monitoring system 20. System 700 then proceeds to "load set up menu information into set up device" 714. The setup menu provides a means for collecting user configuration data. A non-limiting example of setup menu implementations includes: setup application programs; browser interfaces; Java applets; or applications loaded into a network appliance such as a computer 60, cell phone 22, or network appliance 28. In addition, some embodiments envision using a web page interface to enter data into a database to be used to configure the door monitoring system 20. After the set up menu is loaded into the set up device, system 700 proceeds to "user input set up data" 716.

At "user input set up data" 716, the user is prompted to enter application related data as previously described or as would be envisioned by one of ordinary skills in the art. The set up program or application then consolidates the user parameters and prepares them to be downloaded into the door monitoring system 20. System 700 then proceeds to "upload setup data to server" 718.

At "upload set up data to server" 718, the set up device communicates to a server programmed to receive the user parameters. After the data has been successfully uploaded to the server, system 700 proceeds to "server calls door monitoring system" 720.

At "server calls door monitoring system" 720, the server initiates a call or network message protocol to the door monitoring system 20 specified by the user. Illustratively, in some embodiments, the server initiates a call via the phone network that is operably coupled to control unit 42 through network 12, modem 52, or phone line 56. The server then initiates a logon procedure with control unit 42. The initial logon procedure includes an identifying means. Illustratively, some embodiments use the serial number of the door monitoring system 20 or a preset pass code or access code provided with the door monitoring system 20. After successfully logging onto the door monitoring system 20, system 700 proceeds to "download set up data" 724.

At "download set up data" 724, the server downloads the set up data to door monitoring system 20 as described or specified by the user at "user input set up data" 716. This data is stored by control unit 42 in nonvolatile memory for later recall. After successfully downloading the user specified parameters, the server logs out of the door monitoring system 20 and system 700 proceeds to "confirm set up" 726.

At "confirm set up" 726, the server initiates a received call event to the door monitoring system 20 as previously described in relation to FIG. 2. During this process, the server logs into the door monitoring system 20, confirms the report of initial status 130, and executes various command interface functions as previously described. Illustratively, in one embodiment the server request the door monitoring system 20 provide a status report of door monitoring system 20, provide a video picture through the "report picture status" 146 feature, and actuate the garage door using the "open door command" 150 and "close door command" 160. In doing so, the server provides an end-to-end simulation of a remote user contacting and controlling door monitoring system 20 through network 12. Finally, system 700 proceeds to "end" 728, which completes the setup process.

Figure 8:
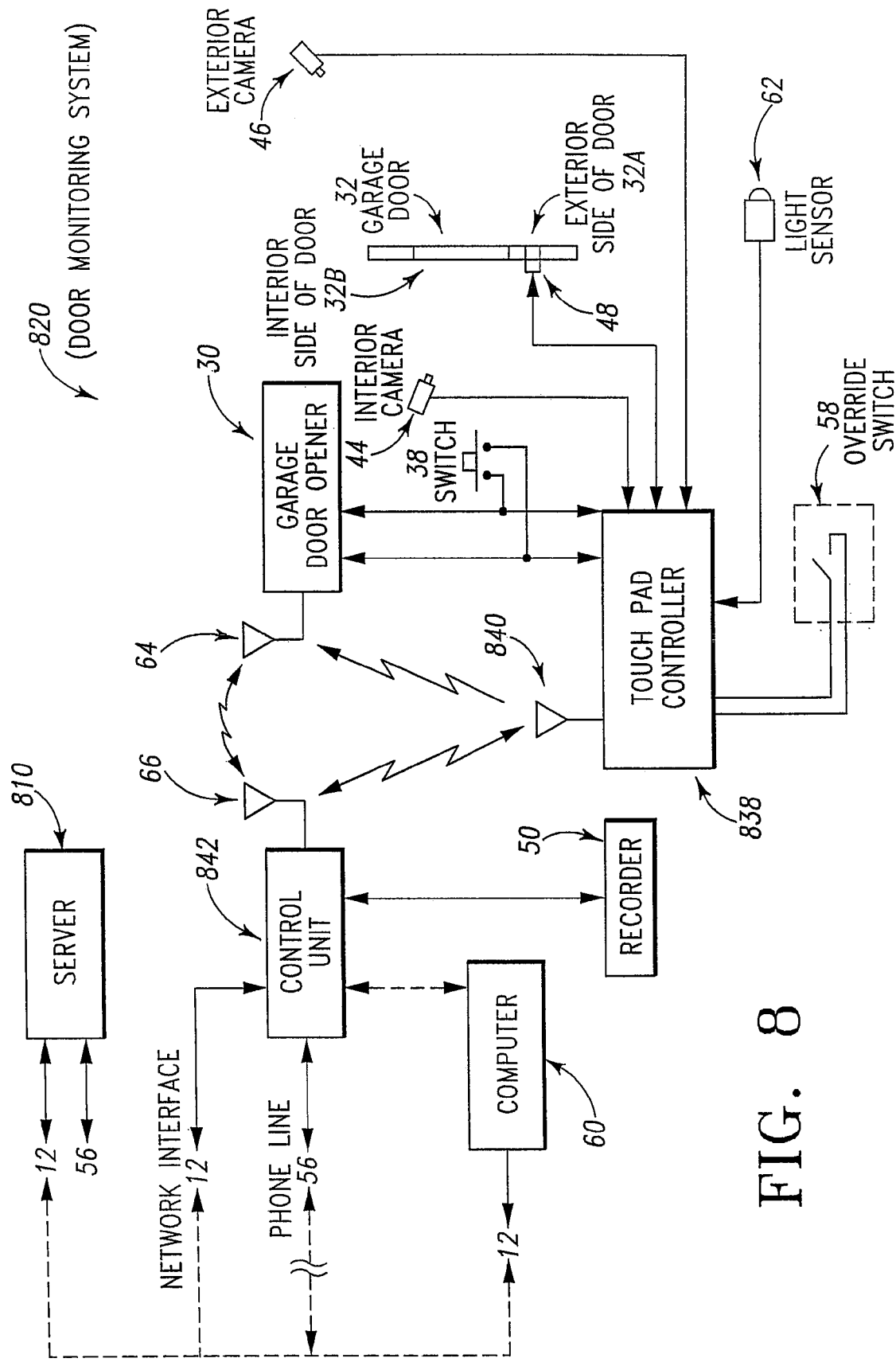
FIG. 8 is a schematic of another embodiment of a door monitoring system that incorporates a touch pad with a wireless link to an image recorder.

Another embodiment of door monitoring system 20 is shown in FIG. 8 as door monitoring system 820. Door monitoring system 820 comprises touch pad controller 838 operably coupled to garage door opener 30 and control unit 842. Door monitoring system 820 is similar to door monitoring system 20 of FIG. 1; however, the system features are distributed between the touch pad controller 838 and control unit 842. Similar to door monitoring system 20, touch pad controller 838 is operably coupled to the interior camera 44, exterior camera 46, door status sensor 48, and light sensor 62. Although not shown, some embodiments of touch pad controller 838 also include an override switch similar to override switch 58 of FIG. 1. In addition, similar to door monitoring system 20, touch pad controller 838 is operably coupled to garage door opener 30. Some embodiments of touch pad controller 838 also comprise an antenna 840, which allows wireless communication to control unit 842. This allows wireless control of garage door opener 30 and touch pad controller 838. As a result, door monitoring system 820 advantageously does not require a network interface be present in an area associated with garage door opener 30. Illustratively, in some embodiments garage door opener 30 also comprises an antenna 64 capable of receiving transmissions from touch pad controller 838 and control unit 842. In some embodiments, the RF interface 64 of garage door opener 30 receives commands directly from control unit 842 through a wireless interface 66.

Control unit 842 comprises a network interface 12, phone line 56, and an interface to computer 60. Although FIG. 8 does not show a modem element similar to modem 52, embodiment of control unit 842 include the features and functions of a device similar to modem 52 as described in relation to FIG. 1.

Figure 9:
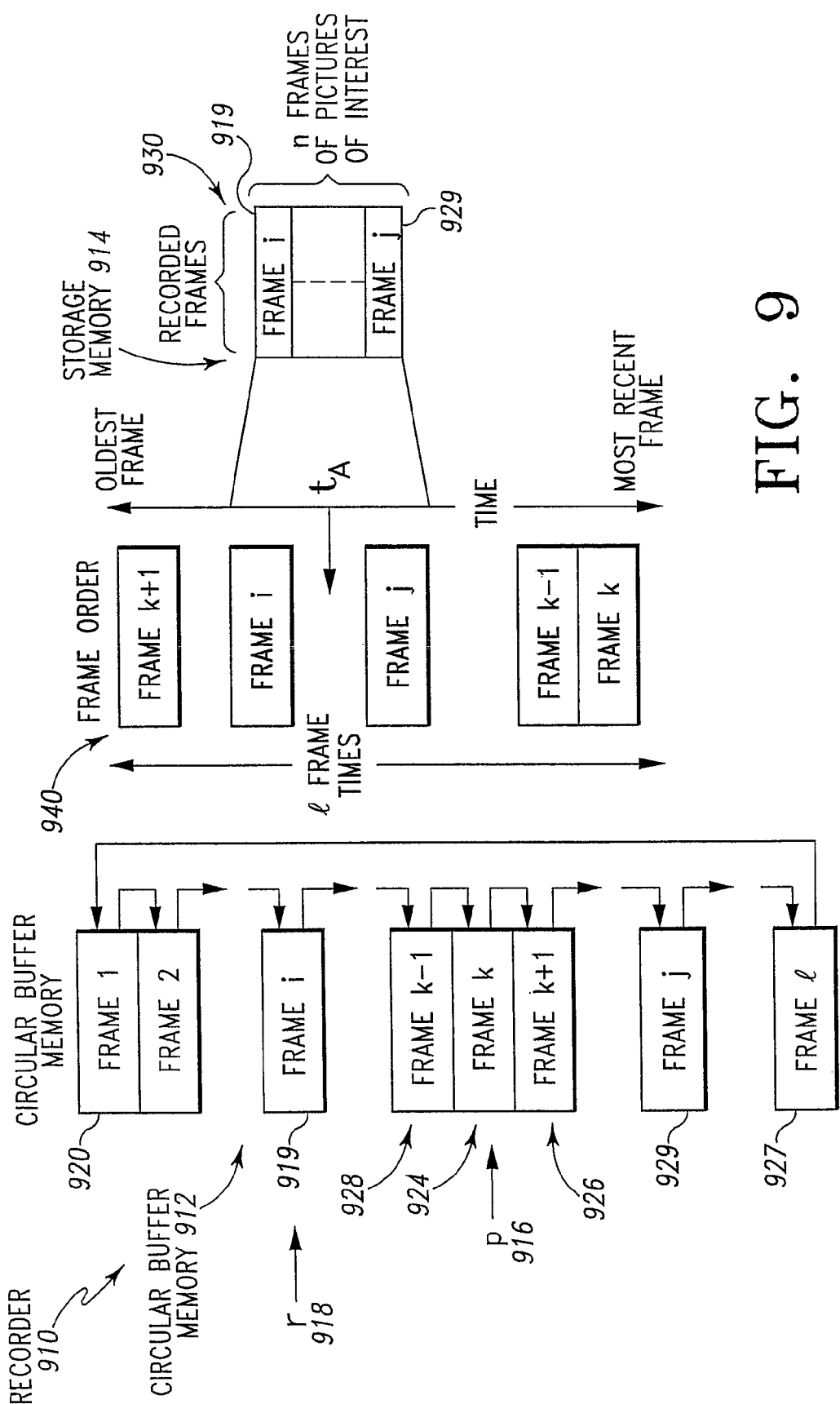
FIG. 9 is a diagram showing the use of a circular buffer to record a sequence of pictures related to the actuation of a door using a door monitoring system, as shown in FIG. 1 and FIG. 8.

As shown in FIG. 9, one embodiment of the recorder 910 comprises a circular buffer memory 912 and a storage memory 914. The circular buffer memory 912 includes a pointer "p" 916, which provides a means for addressing to the most recently stored frame or picture in a sequence as stored in the circular buffer memory 912. In addition, the circular buffer memory 912 also comprises a pointer "r" 918, which provides an address to memory containing a first frame of video or picture of interest to be stored in the storage memory 914.

As shown in FIG. 9, the circular buffer memory 912 is arranged in blocks sufficient to hold a single frame or picture of a video sequence provided by a camera source. Illustrative, the first block of memory of the circular buffer memory 912 is "frame 1" 920. "Frame 1" 920 is linked to succeeding frames of memory such that the circular buffer memory 912 comprises "frame 1" 920 through frame λ 927. Also shown is the $k^{th}$ frame of memory, "frame k" 924, which corresponds to the most recently captured picture or video. Consequently, the $k+1^{th}$ frame of memory, "frame k+1" 926, represents the oldest picture of frame of video within the circular buffer memory 912. Also shown is the $k-1^{th}$ frame of memory, "frame k-1" 928, which corresponds to the picture or frame of video captured just prior to the picture or video frame stored in "frame k" 924.

Pointer "r" 918 provides an address to the $i^{th}$ frame of memory, "frame i" 919. This corresponds to the first picture or frame of video of interest for a given event. Similarly, the $j^{th}$ frame of memory, "frame j" 929, corresponds to the last picture or frame of video of interest for a given event. The "temporal frame order" 940 shows the arrangement of the pictures or video frames within the circular buffer memory 912 in order from the oldest to the most recently-captured video or picture. Memory "frame k+1" 926 corresponds to the oldest frame of video or picture within the circular buffer memory 912, while the "frame k" 924, is the most recent frame of video or picture captured within the circular buffer memory 912.

The recorded frames 930 comprise "n" frames of video or pictures of interest captured during a door monitor event. The first frame of memory within the recorded frames 930 is "frame i" 919. The last frame of memory placed within storage memory 914 as recorded frames 930 is "frame j" 934.

Illustratively, in one embodiment door monitoring system 20 initially places video obtained from the interior camera 44 and exterior camera 46 in circular buffer memory 912. In some embodiments, the circular buffer is part of recorder 910. In other embodiments, circular buffer memory 912 comprises memory associated with recorder 910. The video pictures are arranged in temporal order of their arrival in a linked list memory arrangement comprising "λ" frames of memory. As new frames of video or pictures arrive, recorder 910 replaced the oldest video or picture with the most recently arrived video or picture. Upon a door monitoring event, illustratively an open door command or door close command, control unit 42 (not shown) instructs recorder 910 to store "n" frames of pictures or video of interest, which relate to the time just prior, during, and after completion of the requested command. It will be understood by those skilled in the art that the circular buffer memory must be sufficiently large to allow continuous storage of the incoming pictures or video while allowing sufficient time for recorder 910 to store the recorded frames 930 in storage memory 914. In at least one embodiment of recorder 910, the circular buffer memory 912 and storage memory 914 reside upon a hard drive. In other embodiments, the circular buffer memory comprises a dynamic RAM or flash memory system which is continually updated as new video frames or pictures are received.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method for overriding a notification feature of a door monitoring system that allows a user to remotely actuate a garage door by controlling a garage door opener operably coupled to the garage door; the garage door monitoring system comprising:
    a notification feature, wherein the notification feature comprises a means for sending a notification message to a user that a door is open for a period of time greater than a timer alarm period;
    a control unit comprising a system override state wherein the notification feature of a garage door monitoring system is disabled while allowing other functions to continue, and a system enabled state wherein the notification feature of the garage door monitoring system is enabled;
    a door status sensor operably coupled to the control unit, the door status sensor comprising a door open state and a door closed state, and positioned to detect the status of the garage door; wherein the door open state indicates that the door is open and the door closed state indicates that the door is closed; and
    an override switch operably coupled to the control unit, the override switch comprising an override state and a enabled state, wherein asserting the override switch to the override state puts the door monitoring system in the system override state and asserting the enable state puts the door monitoring system in the system enable state;
the method comprising steps of:
    sensing the state of the override switch;
    setting the door monitoring system in the system override state when the override switch is in the override state, wherein the notification feature of the garage door monitoring system is disabled while allowing at least one other monitoring or control feature of the door monitoring system to continue functioning; and
    setting the door monitoring system in an enabled state when the door status sensor is in the door closed state, wherein the notification feature of the garage door monitoring system is enabled to send a message to the user in the event the garage door is later opened for a period of time greater than the timer alarm period.

2. The method of claim 1, further comprising the step of:
setting the door monitoring system in a system enabled state when the override switch is in the enable state, wherein the notification feature of the garage door monitoring system is enabled.

3. The method of claim 1, wherein the garage monitoring system further comprises a timer and a maximum override period parameter, the method further comprising the step of:
calculating the period of time that the door monitoring system is in a the system override state; and
setting the door monitoring system in the system enabled state after passage of a period of time equal to the maximum override period parameter.

4. The method of claim 1, the garage door monitoring system further comprising a timer and a parameter specifying a time of day when the door monitor system should be placed in the system enable state, the method further comprising the step of:
calculating the time of day; and
setting the door monitoring system in the system enabled state at a time equal to the parameter specifying a time of day when the door monitor system should be placed in the system enable state.

5. The method of claim 4, the garage door monitoring system further comprising a means for detecting sunlight; the method further comprising:
measuring a level of sunlight; and
determining the time of day based upon the ambient level of sunlight detected.

6. A system override mechanism for a garage door monitoring system that allows a user to remotely actuate a garage door, the garage door monitoring system comprising:
a door status sensor comprising a door open state and a door closed state;
a control unit comprising a door status input operably coupled to the door status sensor;
a network interface operably coupled to a network connection;
a timer;
a timer alarm period parameter for setting the maximum period of time prior to notifying the user that the door status sensor is in the door open state;
a voice message generator that provides at least one message to the user via the network connection when the door status sensor is in the door open state for a time period greater than the timer alarm period parameter; and
a notification feature that initiates at least one message to the user when the timer indicates the door status sensor is in the door open state for a time greater than the timer alarm period parameter;
wherein the control unit governs the operation of a garage door opener that actuates a garage door; and
wherein the voice message generator providing at least one voice message to the user via the network connection when the door status sensor is in the door open state for a time period greater than the timer alarm period parameter;
the system override mechanism comprising:
an override switch operably coupled to the control unit, the override switch comprising:
a system override state; and
a system enable state;
wherein, the notification feature of the garage door monitoring system is disabled when the override switch is in a system override state; and
at least one other feature of the of the garage door monitoring system is enabled when the override switch is in a system override state.

* * * * *